(12) United States Patent
Minoo

(10) Patent No.: US 11,339,012 B2
(45) Date of Patent: May 24, 2022

(54) ARTICLE TRANSFER FACILITY

(71) Applicant: Daifuku Co., Ltd., Osaka (JP)

(72) Inventor: Atsushi Minoo, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 17/418,443

(22) PCT Filed: Dec. 2, 2019

(86) PCT No.: PCT/JP2019/046984
§ 371 (c)(1),
(2) Date: Jun. 25, 2021

(87) PCT Pub. No.: WO2020/137364
PCT Pub. Date: Jul. 2, 2020

(65) Prior Publication Data
US 2022/0063932 A1     Mar. 3, 2022

(30) Foreign Application Priority Data

Dec. 26, 2018   (JP) .............................. JP2018-243359

(51) Int. Cl.
*B65G 47/32* (2006.01)
*B65G 47/26* (2006.01)
*B65G 47/52* (2006.01)
*B65G 47/91* (2006.01)

(52) U.S. Cl.
CPC ........... *B65G 47/917* (2013.01); *B65G 47/32* (2013.01); *B65G 2203/0233* (2013.01)

(58) Field of Classification Search
None
See application file for complete search history.

(56) References Cited

U.S. PATENT DOCUMENTS

| | | | | |
|---|---|---|---|---|
| 5,050,090 A | * | 9/1991 | Golub | G06Q 10/08 700/217 |
| 5,098,254 A | * | 3/1992 | Becicka | B65G 61/00 414/792.6 |
| 5,161,698 A | * | 11/1992 | Hatouchi | B65G 1/133 211/122 |
| 5,281,081 A | * | 1/1994 | Kato | B65G 1/1378 414/789.6 |

(Continued)

FOREIGN PATENT DOCUMENTS

JP     8133482 A     5/1996

*Primary Examiner* — Kavel Singh
(74) *Attorney, Agent, or Firm* — The Webb Law Firm

(57) ABSTRACT

A control device (10) of an article transfer facility (100) determines the size of a first dead space surrounded by a set article (Wd) and a target article (Wc) located at a first candidate position (P1). If the size of the first dead space is smaller than a first threshold (TH1), the control device (10) sets the first candidate position (P1) as the arrangement position of the target article (Wc). If the size of the first dead space is greater than or equal to the first threshold (TH1), the control device (10) determines the size of a second dead space surrounded by the set article (Wd) and the target article (Wc) located at a second candidate position (P2). If the size of the second dead space is smaller than a second threshold (TH2), the control device (10) sets the second candidate position (P2) as the arrangement position of the target article (Wc).

16 Claims, 13 Drawing Sheets

(56) References Cited

U.S. PATENT DOCUMENTS

| | | | | |
|---|---|---|---|---|
| 5,794,416 A * | 8/1998 | Rahman | ................ | B65G 67/20 |
| | | | | 53/157 |
| 5,857,311 A * | 1/1999 | Focke | .................... | B65B 5/105 |
| | | | | 53/434 |
| 6,055,462 A * | 4/2000 | Sato | ...................... | B25J 9/1687 |
| | | | | 700/217 |
| 10,843,878 B2 * | 11/2020 | Ukisu | ................. | B65G 47/905 |
| 2007/0248448 A1 * | 10/2007 | Starz | .................... | B65G 61/00 |
| | | | | 414/788 |

* cited by examiner

Fig.1

ARTICLE TRANSFER FACILITY

CROSS-REFERENCE TO RELATED APPLICATIONS

This application is the United States national phase of International Application No. PCT/JP2019/046984 filed Dec. 2, 2019, and claims priority to Japanese Patent Application No. 2018-243359 filed Dec. 26, 2018, the disclosures of which are hereby incorporated by reference in their entirety.

BACKGROUND OF THE INVENTION

Field of the Invention

The present invention relates to an article transfer facility that performs an article transfer operation.

Description of Related Art

The following Patent Document 1 (JP H8-133482A) discloses an article transfer facility that includes a transfer device (palletizing robot 1) that holds an article and arranges the article in an arrangement region (pallet) that has a rectangular shape in a plan view, and a control device (robot controller 13) that controls the transfer device. Note that member names and reference signs in parentheses in the description of background art are those used in Patent Document 1.

In the article transfer facility described in Patent Document 1, articles are arranged so as to fill the arrangement region from the distal side, i.e., from the side away from the transfer device. Specifically, articles are arranged in the left-right direction (X direction) orthogonal to the depth direction (Y direction) in a plan view, on the most distal side in the arrangement region, and if there is no longer a space for arranging articles in the left-right direction (X direction), the arrangement position is shifted to the proximal side, and articles are arranged again in the left-right direction (X direction). A reduction in dead space formed in the arrangement region is achieved by repeating such an operation.

Patent Document 1: JP H8-133482A

SUMMARY OF THE INVENTION

In the article transfer facility described in Patent Document 1, however, even if a large dead space is formed when articles are arranged in the left-right direction (X direction), the arrangement position of the articles in the depth direction (Y direction) is changed only after there is no longer a space for arranging the articles in the left-right direction (X direction). For this reason, the article transfer facility described in Patent Document 1 has room for improvement in the reduction in the dead space formed in the arrangement region for articles.

There is a desire for realization of an article transfer facility in which dead space formed in the arrangement region for articles can be appropriately reduced.

In view of the foregoing, a characteristic configuration of an article transport facility lies in an article transfer facility that performs an article transfer operation, including:
a transfer device for holding an article and arranging the article in an arrangement region having a rectangular shape in a plan view; and
a control device for controlling the transfer device, wherein, letting one corner portion of the arrangement region be a reference corner portion, a direction parallel to one of two orthogonal sides of the arrangement region be a first direction, a direction parallel to the other one of the two orthogonal sides of the arrangement region be a second direction, the side farther from the reference corner portion in the first direction be a far side in the first direction, the side closer to the reference corner portion in the first direction be a close side in the first direction, the side farther from the reference corner portion in the second direction be a far side in the second direction, and the side closer to the reference corner portion in the second direction be a close side in the second direction, the control device is configured to perform setting of an arrangement position of the article in the arrangement region such that a plurality of the articles are arranged in order from a position adjacent to the reference corner portion, and to control the transfer device in accordance with the setting, also letting every article whose arrangement position in the arrangement region has already been set be a set article, and an article whose arrangement position is to be set next be a target article, the control device determines a size of a first dead space, which is a dead space in a plan view formed in a region surrounded by the set article and the target article if the target article is arranged at a first candidate position, which is a position adjacent to the set article on the far side in the first direction and is an end position on the close side in the second direction, if the size of the first dead space is smaller than a prescribed first threshold, the control device sets the first candidate position as the arrangement position of the target article, if the size of the first dead space is greater than or equal to the first threshold, the control device determines a size of a second dead space, which is a dead space in a plan view formed in a region surrounded by the set article and the target article if the target article is arranged at a second candidate position, which is a position adjacent to the set article on the far side in the second direction and is an end position on the close side in the first direction, and if the size of the second dead space is smaller than a prescribed second threshold, the control device sets the second candidate position as the arrangement position of the target article.

According to this characteristic configuration, not only the first candidate position adjacent to the set article on the far side in the first direction but also the second candidate position adjacent to the set article on the far side in the second direction are candidates for the arrangement position of the target article, in accordance with the size of the first dead space and the size of the second dead space. That is to say, the direction in which articles are arranged is changed in accordance with the size of the first dead space and the size of the second dead space. Thus, articles can be efficiently arranged in the arrangement region. As a result, dead space formed in the arrangement region for articles can be appropriately reduced.

BRIEF DESCRIPTION OF THE DRAWINGS

FIG. 1 is a plan view of an article transfer facility according to an embodiment.

DETAILED DESCRIPTION OF PREFERRED EMBODIMENTS

Figure 1:
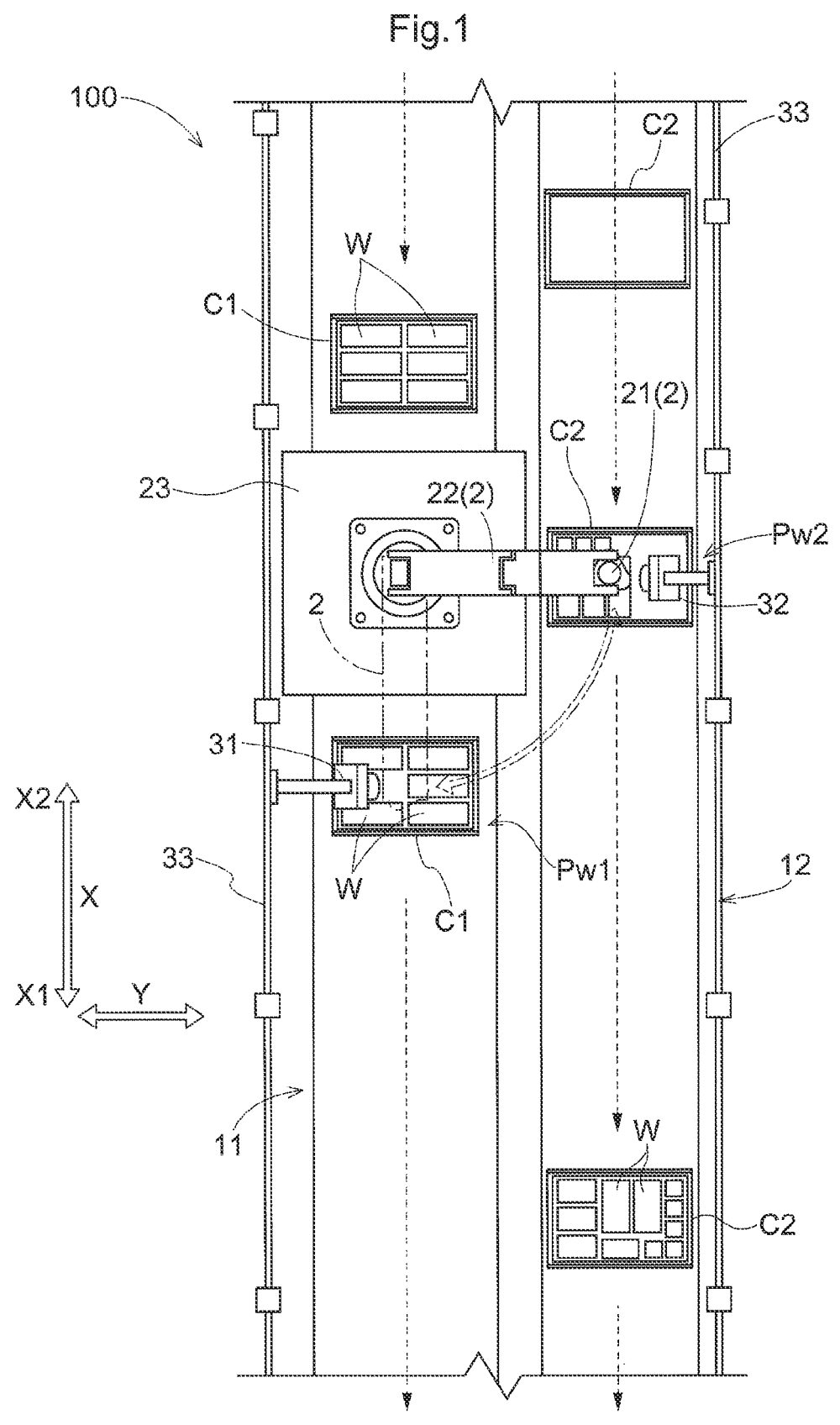

Hereinafter, an article transfer facility 100 according to the embodiment will be described with reference to the drawings. The article transfer facility 100 performs an operation of transferring articles W. As shown in FIG. 1, in the present embodiment, the article transfer facility 100 transfers articles W from a first container C1 to a second container C2.

Figure 2:
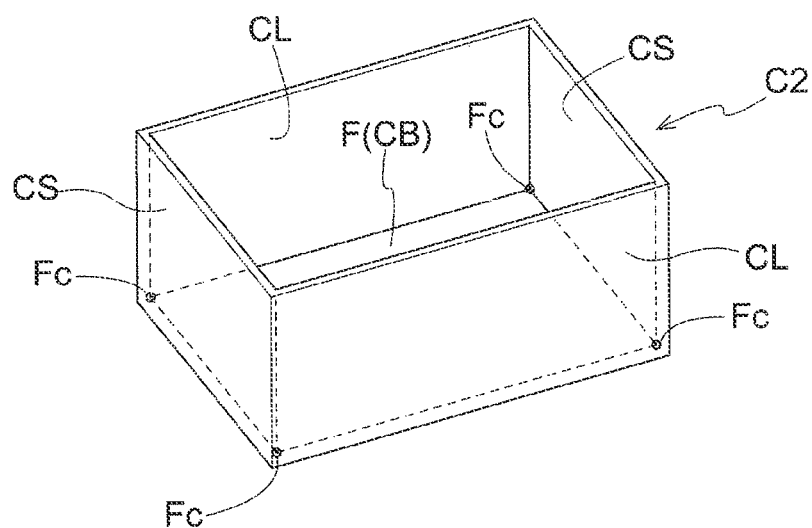
FIG. 2 is a perspective view of a second container having a mounting surface serving as an arrangement region for articles.

As shown in FIG. 2, the second container C2 has a bottom portion CB with a mounting surface F onto which articles W are to be placed, a pair of long-wall portions CL that respectively rise from a pair of long sides of the mounting surface F, and a pair of short-wall portions CS that respectively rise from a pair of short sides of the mounting surface F. The second container C2 also has four corner portions Fc located at the corners of the mounting surface F. Thus, in the present embodiment, the second container C2 is formed to have a rectangular parallelepiped shape with an open upper surface. In the present embodiment, the first container C1 is also formed to have a rectangular parallelepiped shape with an open upper surface. Here, the mounting surface F of the second container C2 corresponds to an "arrangement region having a rectangular shape in a plan view". Note that, in the present application, the "rectangular shape" includes rectangles and squares.

In the present embodiment, the article transfer facility 100 includes a first transport device 11 that transports first containers C1, and a second transport device 12 that transports second containers C2, as shown in FIG. 1.

In the following description, the direction in which the first containers C1 and the second containers C2 are transported is referred to as a "transport direction X", and the downstream side and the upstream side in the transport direction X are referred to as a "downstream side X1" and an "upstream side X2", respectively. Furthermore, the direction orthogonal to the transport direction X in a plan view is referred to as a "transport width direction Y".

The first transport device 11 is a device that transports the first containers C1 in the transport direction X. In the present embodiment, the first transport device 11 transports the first containers C1 in an orientation in which the short sides of a mounting surface of each first container C1 is parallel to the transport direction X. Any of various known transport devices, such as a roller conveyor and a belt conveyor, can be employed as the first transport device 11.

A first work position Pw1 is preset in a transport path of the first transport device 11. The first transport device 11 transports each first container C1 from a first transport source, which is located outside the figure, to the first work position Pw1. The first transport device 11 then transports the first container C1 from the first work position Pw1 to a first transport destination, which is located outside the figure. One or more articles W are stored in the first container C1 transported to the first work position Pw1 by the first transport device 11. For example, a plurality of articles W of the same type are stored in one first container C1.

The second transport device 12 is a device that transports the second containers C2 in the transport direction X. In the present embodiment, the second transport device 12 transports the second containers C2 in an orientation in which the short sides of the mounting surface F of each second container C2 are parallel to the transport direction X, that is, an orientation in which the short-wall portions CS are parallel to the transport direction X. The second transport device 12 is arranged adjacent to the first transport device 11 in the transport width direction Y. Any of various known transport devices, such as a roller conveyor and a belt conveyor, can be employed as the second transport device 12.

A second work position Pw2 is preset in a transport path of the second transport device 12. The second transport device 12 transports each second container C2 from a second transport source, which is located outside the figure, to the second work position Pw2. The second transport device 12 then transports the second container C2 from the second work position Pw2 to a second transport destination, which is located outside the figure. No article W is stored in the second container C2 transported to the second work position Pw2 by the second transport device 12, whereas a single or a plurality of articles W of one type or a plurality of articles W of different types transported from a first container C1 are stored in the second container C2 transported from the second work position Pw2.

As shown in FIG. 1, the article transfer facility 100 includes a transfer device 2 that holds an article W and arrange the article W in the arrangement region having a rectangular shape in a plan view (here, the mounting surface F of the second container C2). In the present embodiment, the transfer device 2 transfers articles W stored in the first container C1 located at the first work position Pw1 to the second container C2 located at the second work position Pw2. The transfer device 2 includes a holding portion 21 for holding an article W, and a moving mechanism 22 for moving the holding portion 21.

In the present embodiment, the holding portion 21 includes suction pads that can be switched between a suctioning state in which the suction pads work on an object (article W) to be suctioned, and a non-suctioning state in which the suction pads do not work on the object to be suctioned. In the present embodiment, the moving mechanism 22 includes a multi-joint robot arm having a leading end portion to which the holding portion 21 is attached.

In the present embodiment, the transfer device 2 is mounted on a mounting platform 23. The mounting platform 23 is arranged above the first transport device 11 so as to cover a portion of the first transport device 11 in a plan view. The mounting platform 23 is arranged adjacent, in the transport width direction Y, to the second work position Pw2 that is preset in the transport path of the second transport device 12. Accordingly, in the present embodiment, the transport device 2 is arranged on the first transport device 11 side in the transport width direction Y, adjacent to the second work position Pw2 in the transport width direction Y. Note that, in the present embodiment, the first work position Pw1 is preset on the downstream side X1 of the mounting platform 23 in the transport path of the first transport device 11 in a plan view.

In the present embodiment, the article transfer facility 100 includes a first image capture device 31 for capturing an image of the inside of the first container C1 located at the first work position Pw1, and a second image capture device 32 for capturing an image of the inside of the second container C2 located at the second work position Pw2, as shown in FIG. 1. In the present embodiment, the first image capture device 31 and the second image capture device 32 are fixed to a fence member 33 that surrounds a region in which the first transport device 11, the second transport device 12, and the transfer device 2 are installed.

Figure 3:
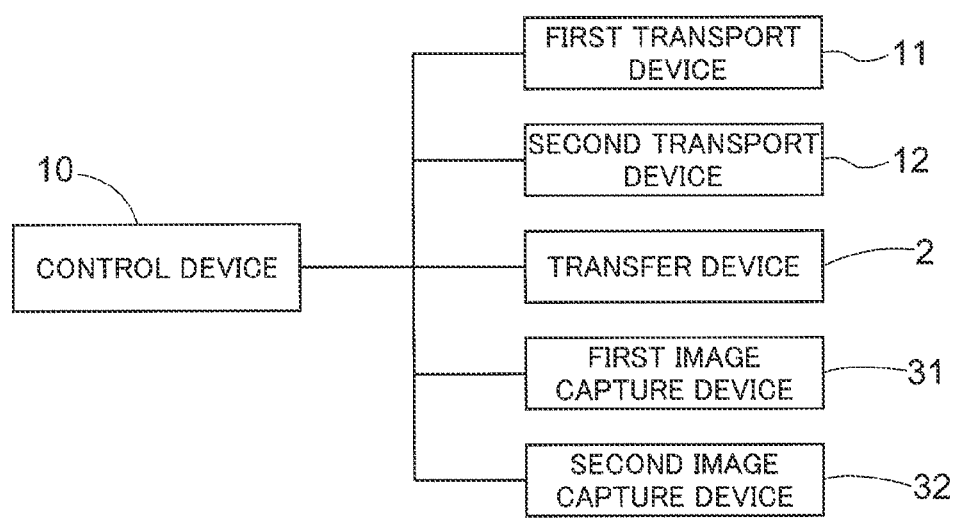
FIG. 3 is a control block diagram.

As shown in FIG. 3, the article transfer facility 100 includes a control device 10 for controlling the transfer device 2. In the present embodiment, the control device 10 switches between the suctioning state of working on an article W and the non-suctioning state of not working on an article W by controlling the holding portion 21. Further, in the present embodiment, the control device 10 changes the orientation of the holding portion 21 and moves the holding portion 21 within a prescribed area by controlling the moving mechanism 22.

In the present embodiment, the control device 10 controls the first transport device 11 and the second transport device 12. Specifically, the control device 10 controls driving sources that drive driven members (e.g., rollers, belts etc.) of the first transport device 11 and the second transport device 12 to transport each first container C1 to the first work position Pw1 and transport each second container C2 to the second work position Pw2. Thereafter, the control device 10 stops the first container C1 and the second container C2 at the first work position Pw1 and the second work position Pw2, respectively, until the transfer operation performed by the transfer device 2 is complete.

In the present embodiment, the control device 10 controls the first image capture device 31 and the second image capture device 32. The control device 10 recognizes the position and the orientation of the first container C1 located at the first work position Pw1, and the state of the inside of this first container C1 (the presence of articles W, the position and the orientation of the articles W etc.), based on captured image information transmitted from the first image capture device 31. Further, the control device 10 recognizes the position and the orientation of the second container C2 located at the second work position Pw2, and the state of the inside of this second container C2 (the presence of articles W, the position and the orientation of the articles W etc.), based on captured image information transmitted from the second image capture device 32.

In the following, an example of the operation of the control device 10 will be described with reference to FIGS. 4 to 12. The control device 10 is configured to set an arrangement position of an article W, namely the position at which each article W is to be arranged, in the arrangement region so as to arrange articles W in order from a position adjacent to a reference corner portion Fcb, which is one of the four corner portions Fc of the arrangement region (here, the mounting surface F of the second container C2), and control the transfer device 2 in accordance with this setting. In the following description, every article W whose arrangement position in the arrangement region has already been set is referred to as a "set article Wd", and an article W whose arrangement position is to be set next is referred to as a "target article Wc". Note that, in the examples shown in FIGS. 4 to 12, each article W is formed to have a rectangular shape in a plan view.

In the following description, a direction parallel to one of two orthogonal sides of the arrangement region (here, a short side (short-wall portion CS) of the mounting surface F) is referred to as a first direction S, and a direction parallel to the other one of the two orthogonal sides of the arrangement region (here, a long side (long-wall portion CL) of the mounting surface F) is referred to as a second direction L. Further, the side farther from the reference corner portion Fcb in the first direction S is referred to as a "far side in the first direction S1", and the side closer to the reference corner portion Fcb in the first direction S is referred to as a "close side in the first direction S2". The side farther from the reference corner portion Fcb in the second direction L is referred to as a "far side in the second direction L1", and the side closer to the reference corner portion Fcb in the second direction L is referred to as a "close side in the second direction L2".

In the present embodiment, the control device 10 sets the arrangement positions of all articles W to be transferred, and then controls the transfer device 2 such that all articles W are transferred in accordance with this setting. In this regard, FIGS. 4 to 12 show some set articles Wd and target articles Wc with solid lines, but merely show articles W for which the setting of the arrangement position in the arrangement region is complete, and it does not mean that the articles W have actually been arranged in the arrangement region. Note that the control device 10 may alternatively be configured to repeat a control to set the arrangement position of one article W and then cause the transfer device to actually arrange this article W in the arrangement region.

First, examples in which there is one set article Wd will be described with reference to FIGS. 4 to 7. In the examples shown in FIGS. 4 to 7, the arrangement position of the set article Wd has been set such that one corner portion of the set article Wd is adjacent to the reference corner portion Fcb of the mounting surface F, and such that the set article Wd is adjacent to both the short-wall portion CS and the long-wall portion CL of the second container C2 that extend from the reference corner portion Fcb.

Figure 4:
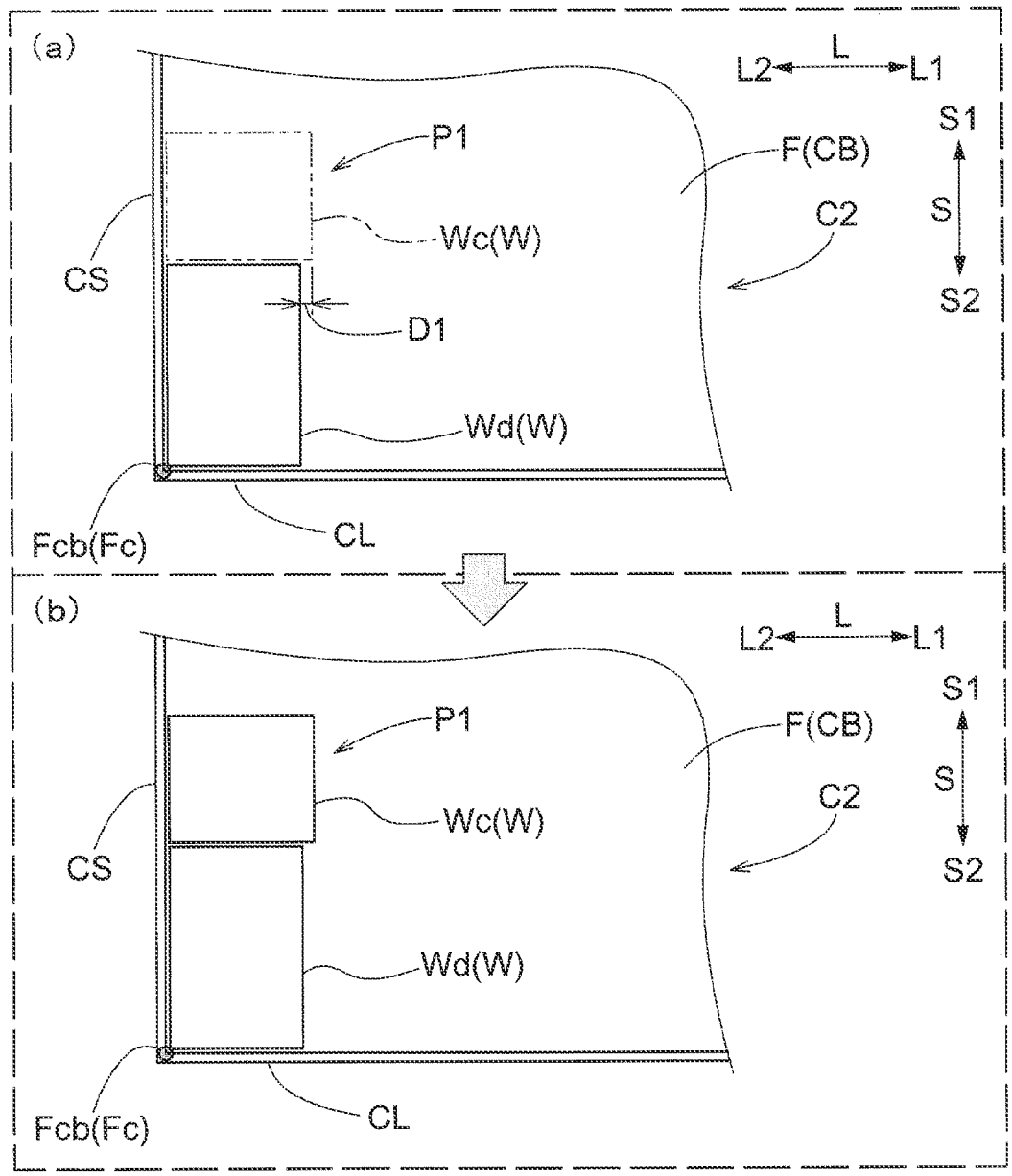
FIG. 4 is a diagram illustrating processing for setting an arrangement position of a target article performed by a control unit when there is one set article.

In the example shown in FIG. 4, the control device 10 first detects a first candidate position P1, which is a candidate for the arrangement position of the target article Wc. The first candidate position P1 is a position adjacent to the set article Wd in the far side in the first direction S1 and is an end position on the close side in the second direction L2 (see the portion (a) in FIG. 4). Note that, in the example shown in FIG. 4, the "end position on the close side in the second direction L2" is a position adjacent to the short-wall portion CS. However, if the position adjacent to the short-wall portion CS has been set as the arrangement position of the set article Wd, and there is no space for arranging the target article Wc at a position adjacent to the short-wall portion CS, a position adjacent to the set article Wd on the far side in the second direction L1 corresponds to the "end position on the close side in the second direction L2".

Next, the control device 10 determines the size of a first dead space, which is a dead space in a plan view formed in a region surrounded by the set article Wd and the target article Wc if the target article Wc is arranged at the first candidate position P1.

In this example, the size of the first dead space is determined based on a first protrusion length D1, which is a protrusion length in the second direction L of the target article Wc relative to the set article Wd (see the portion (a) in FIG. 4). Specifically, the control device 10 compares the first protrusion length D1 with a prescribed first protrusion threshold TH1. The first protrusion threshold TH1 corresponds to a "first threshold".

In the example shown in FIG. 4, the first protrusion length D1 is smaller than the first protrusion threshold TH1. In this case, the control device 10 sets the first candidate position P1 as the arrangement position of the target article Wc (see the portion (b) in FIG. 4).

Figure 5:
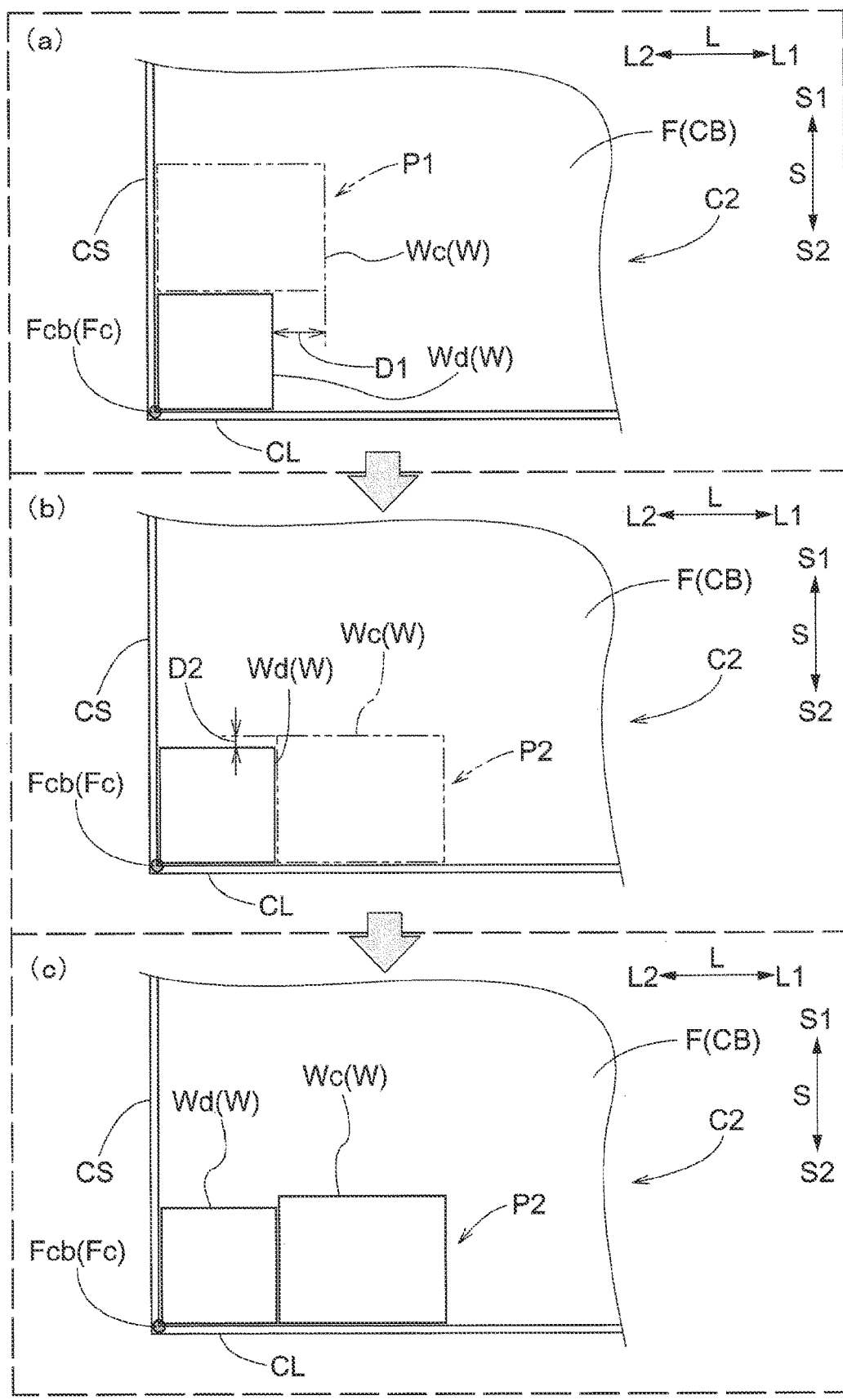
FIG. 5 is a diagram illustrating processing for setting an arrangement position of a target article performed by the control unit when there is one set article.

In the example shown in FIG. 5, the first protrusion length D1 is greater than or equal to the first protrusion threshold TH1, unlike the example shown in FIG. 4 (see the portion (a) in FIG. 5). In this case, the control device 10 detects a second candidate position P2, which is a candidate for the arrangement position of the target article Wc and differs from the first candidate position P1 (see the portion (b) in FIG. 5). The second candidate position P2 is a positon adjacent to the set article Wd on the far side in the second direction L1 and is an end position on the close side in the first direction S2. Note that, in the example shown in FIG. 5, the "end position on the close side in the first direction S2" is a position adjacent to the long-wall portion CL. However, if the position adjacent to the long-wall portion CL has been set as the arrangement position of the set article Wd, and there is no space for arranging the target article Wc at a position adjacent to the long-wall portion CL, a position adjacent to the set article Wd on the far side in the first direction S1 corresponds to the "end position on the close side in the first direction S2".

The control device 10 determines the size of a second dead space, which is a dead space in a plan view formed in a region surrounded by the set article Wd and the target article Wc if the target article Wc is arranged at the second candidate position P2.

In this example, the size of the second dead space is determined based on a second protrusion length D2, which is a protrusion length in the first direction S of the target article Wc relative to the set article Wd. Specifically, the control device 10 compares the second protrusion length D2 with a prescribed second protrusion threshold TH2. The second protrusion threshold TH2 corresponds to a "second threshold".

In the example shown in FIG. 5, the second protrusion length D2 is smaller than the second protrusion threshold TH2. In this case, the control device 10 sets the second candidate position P2 as the arrangement position of the target article Wc (see the portion (c) in FIG. 5).

Figure 6:
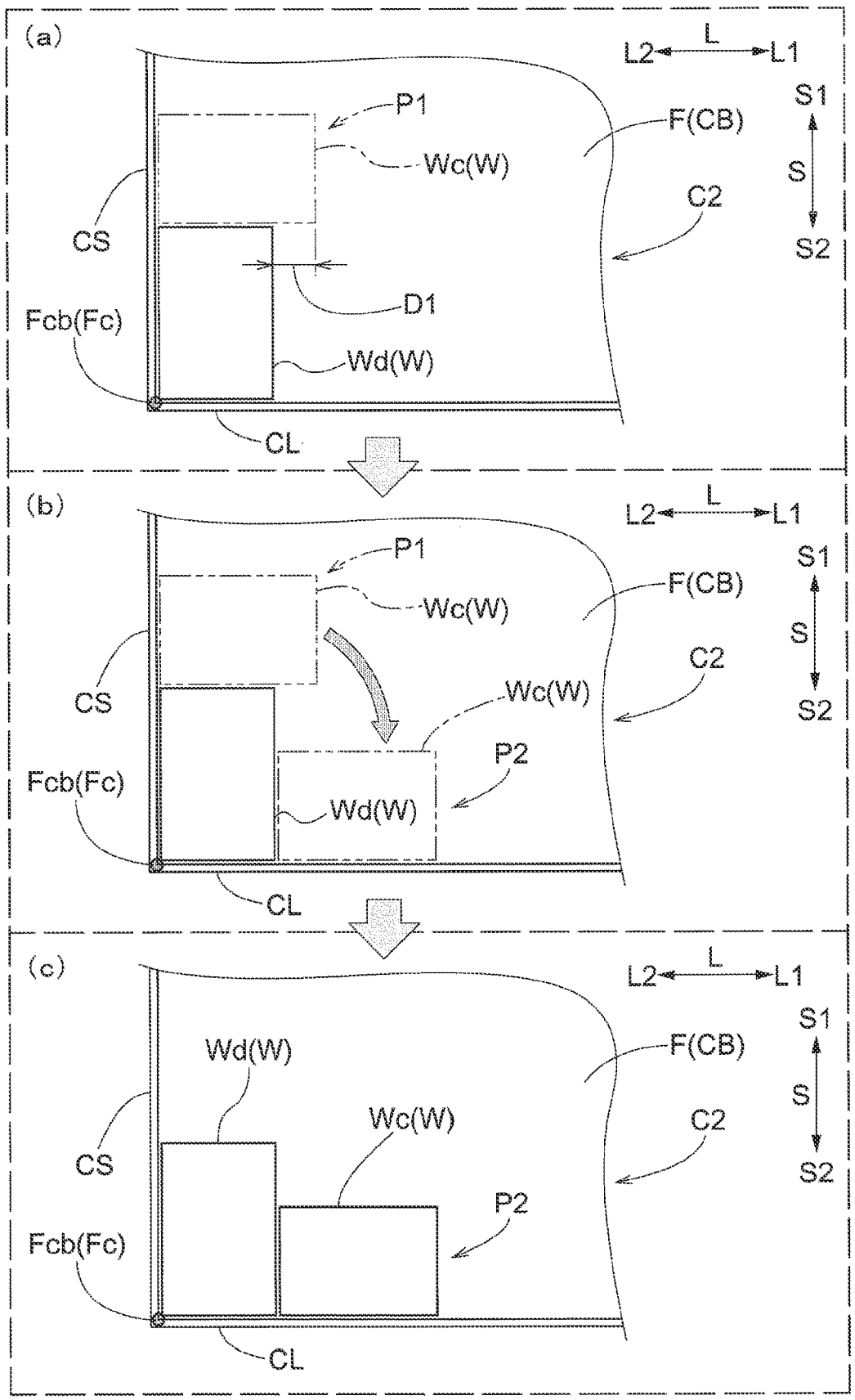
FIG. 6 is a diagram illustrating processing for setting an arrangement position of a target article performed by the control unit when there is one set article.

In the example shown in FIG. 6, the first protrusion length D1 is greater than or equal to the first protrusion threshold TH1, similarly to the example shown in FIG. 5 (see the portion (a) in FIG. 6). However, at the second candidate position P2, the target article Wc does not protrude in the first direction S relative to the set article Wd (see the portion (b) in FIG. 6), unlike the example shown in FIG. 5. In this case as well, the control device 10 sets the second candidate position P2 as the arrangement position of the target article Wc, similarly to the example shown in FIG. 5 (see the portion (c) in FIG. 6).

Figure 7:
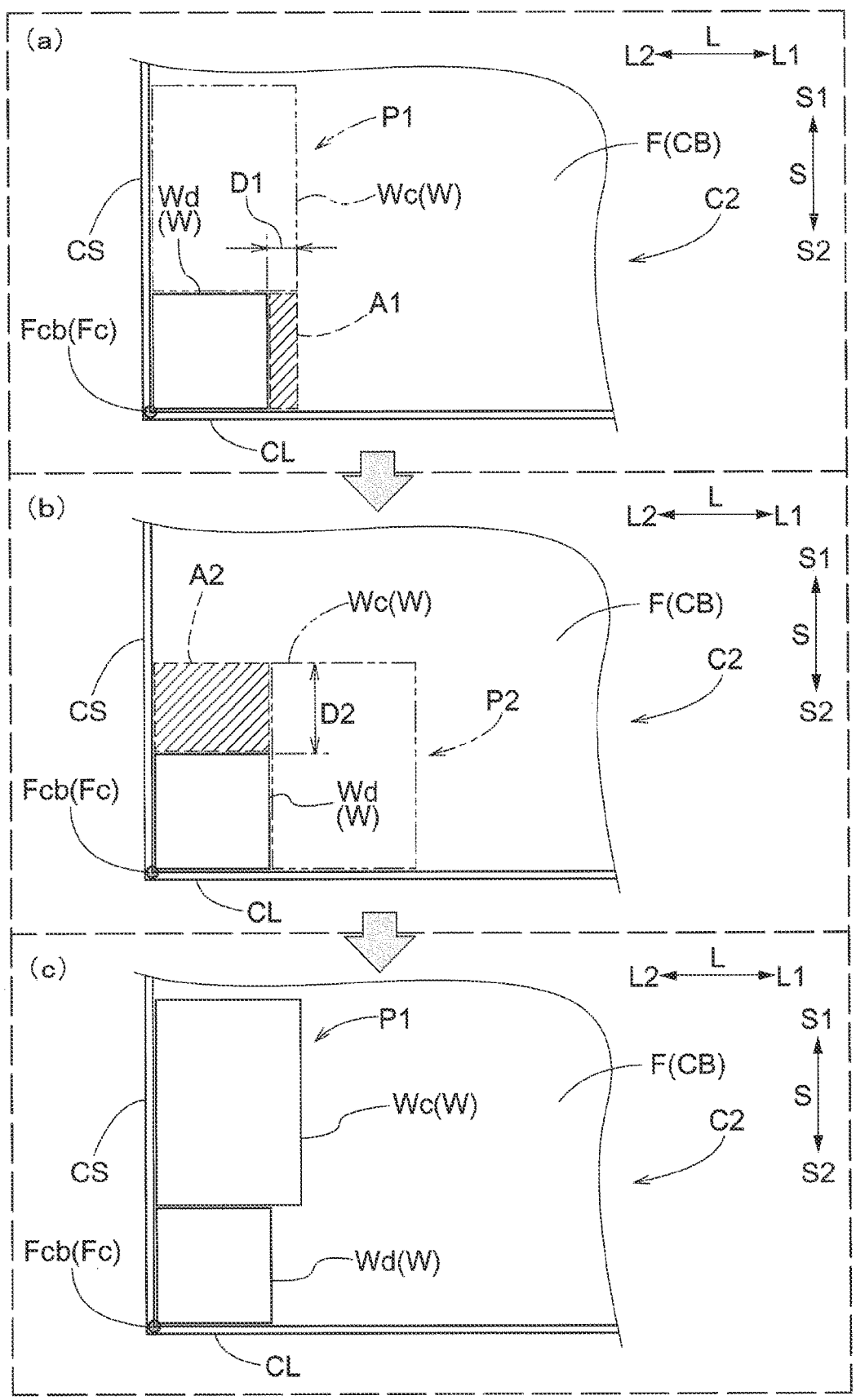
FIG. 7 is a diagram illustrating processing for setting an arrangement position of a target article performed by the control unit when there is one set article.

In the example shown in FIG. 7, the first protrusion length D1 is greater than or equal to the first protrusion threshold TH1 (see the portion (a) in FIG. 7), similarly to the examples shown in FIGS. 5 and 6. However, the second protrusion length D2 is greater than or equal to the second protrusion threshold TH2 (see the portion (b) in FIG. 7), unlike the examples shown in FIGS. 5 and 6. In this case, the control device 10 compares the size of the first dead space with the size of the second dead space.

In this example, the size of the first dead space is compared with the size of the second dead space based on a first area A1, which is the area of the first dead space (see the portion (a) in FIG. 7), and a second area A2, which is the area of the second dead space (see the portion (b) in FIG. 7).

Here, the first area A1 is the area of a rectangular region surrounded by the target article Wc located at the first candidate position P1, the set article Wd, and the long-wall portion CL, and is calculated based on the first protrusion length D1. The second area A2 is the area of a rectangular region surrounded by the target article Wc located at the second candidate position P2, the set article Wd, and the short-wall portion CS, and is calculated based on the second protrusion length D2.

In the example shown in FIG. 7, the first area A1 is smaller than the second area A2. In this case, the control device 10 sets the first candidate position P1, which is the position of the target article Wc that forms the first dead space, as the arrangement position of the target article Wc (see the portion (c) in FIG. 7).

Next, examples in which there are two set articles Wd will be described with reference to FIGS. 8 to 12. In the following description, of the two set articles Wd, the set article Wd whose arrangement position has been set first is referred to as a "first set article Wd1", and the set article Wd whose arrangement position has been set next is referred to as a "second set article Wd2". Note that the length in the second direction L of the first set article Wd1 is greater than the length in the second direction L of the second set article Wd2.

In the examples in FIGS. 8 to 12, the arrangement position of the first set article Wd1 has been set such that one corner portion of the first set article Wd1 is adjacent to the reference corner portion Fcb of the mounting surface F, and such that the first set article Wd1 is adjacent to both the short-wall portion CS and the long-wall portion CL of the second container C2 that extend from the reference corner portion Fcb. The arrangement position of the second set article Wd2 has been set such that one corner portion of the second set article Wd2 is adjacent to a corner portion of the first set article Wd1 that is located in an end position on the far side in the first direction S1 and on the close side in the second direction L2, and such that the second set article Wd2 is adjacent to both the surface of the first set article Wd1 on the far side in the first direction S1 and the short-wall portion CS of the second container C2.

Figure 8:
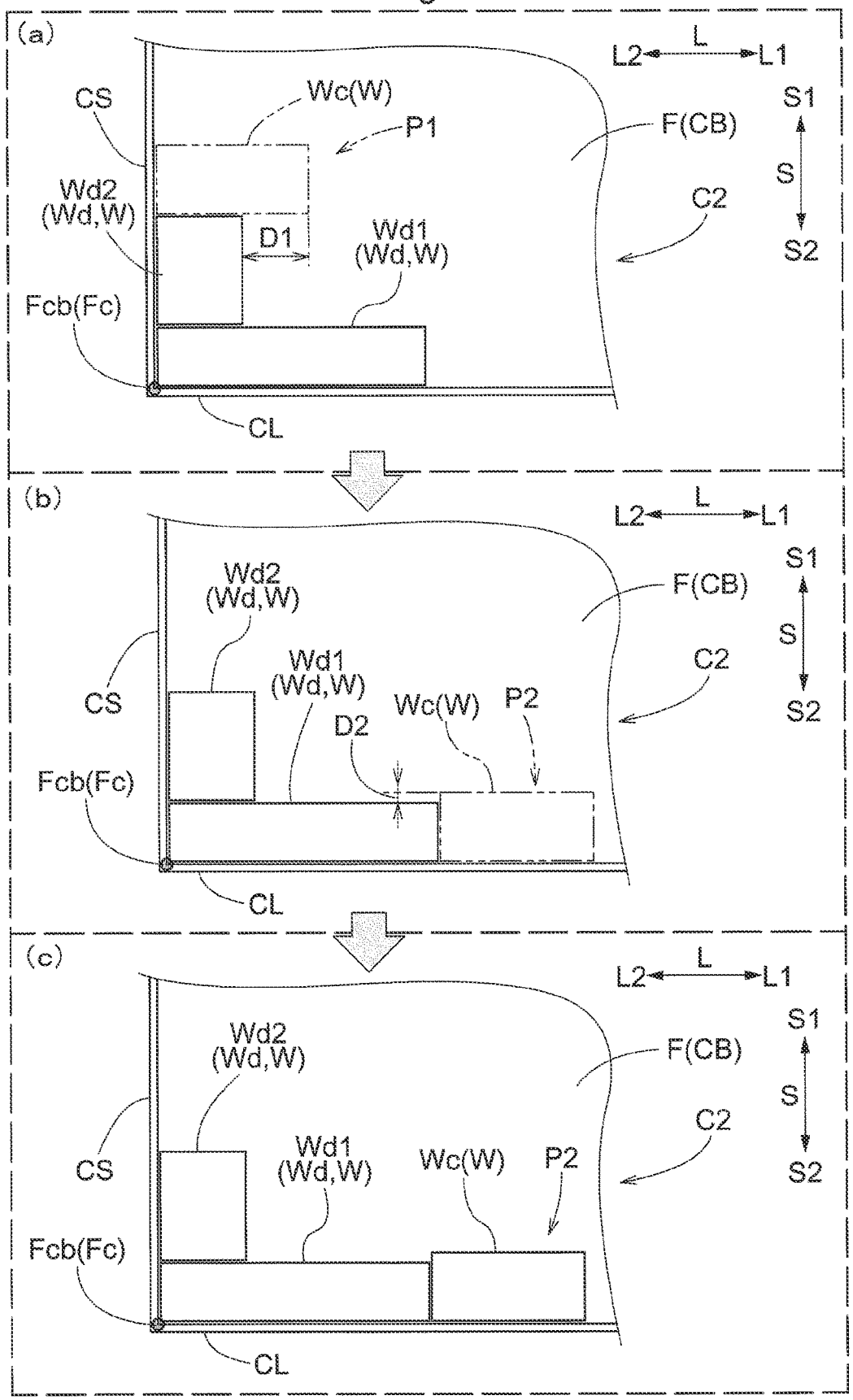
FIG. 8 is a diagram illustrating processing for setting an arrangement position of a target article performed by the control unit when there are two set articles.

In the example shown in FIG. 8, the control device 10 first detects the first candidate position P1, which is a candidate for the arrangement position of the target article Wc. The first candidate position P1 is a position adjacent to a set article Wd in the far side in the first direction S1 and is an end position on the close side in the second direction L2. Here, the first candidate position P1 is adjacent to the second set article Wd2 on the far side in the first direction S1 (see the portion (a) in FIG. 8).

Next, the control device 10 determines the size of a first dead space, which is a dead space in a plan view formed in a region surrounded by the set article Wd and the target article Wc if the target article Wc is arranged at the first candidate position P1. Specifically, the control device 10 compares the first protrusion length D1 with the first protrusion threshold TH1. Here, the first protrusion length D1 is a protrusion length in the second direction L of the target article Wc relative to the second set article Wd2.

In the example shown in FIG. 8, the first protrusion length D1 is greater than or equal to the first protrusion threshold TH1 (see the portion (a) in FIG. 8). In this case, the control device 10 detects the second candidate position P2, which is a candidate for the arrangement position of the target article Wc and differs from the first candidate position P1. The second candidate position P2 is a position adjacent to a set article Wd on the far side in the second direction L1 and is an end position on the close side in the first direction S2. Here, the second candidate position P2 is adjacent to the first set article Wd1 on the far side in the second direction L1 (see the portion (b) in FIG. 8).

The control device 10 determines the size of a second dead space, which is a dead space in a plan view formed in a region surrounded by the set article Wd and the target article Wc if the target article Wc is arranged at the second candidate position P2. Specifically, the control device 10 compares the second protrusion length D2 with the second protrusion threshold TH2. Here, the second protrusion length D2 is a protrusion length in the first direction S of the target article Wc relative to the first set article Wd1.

In the example shown in FIG. 8, the second protrusion length D2 is smaller than the second protrusion threshold TH2. In this case, the control device 10 sets the second candidate position P2 as the arrangement position of the target article Wc (see the portion (c) in FIG. 8).

Figure 9:
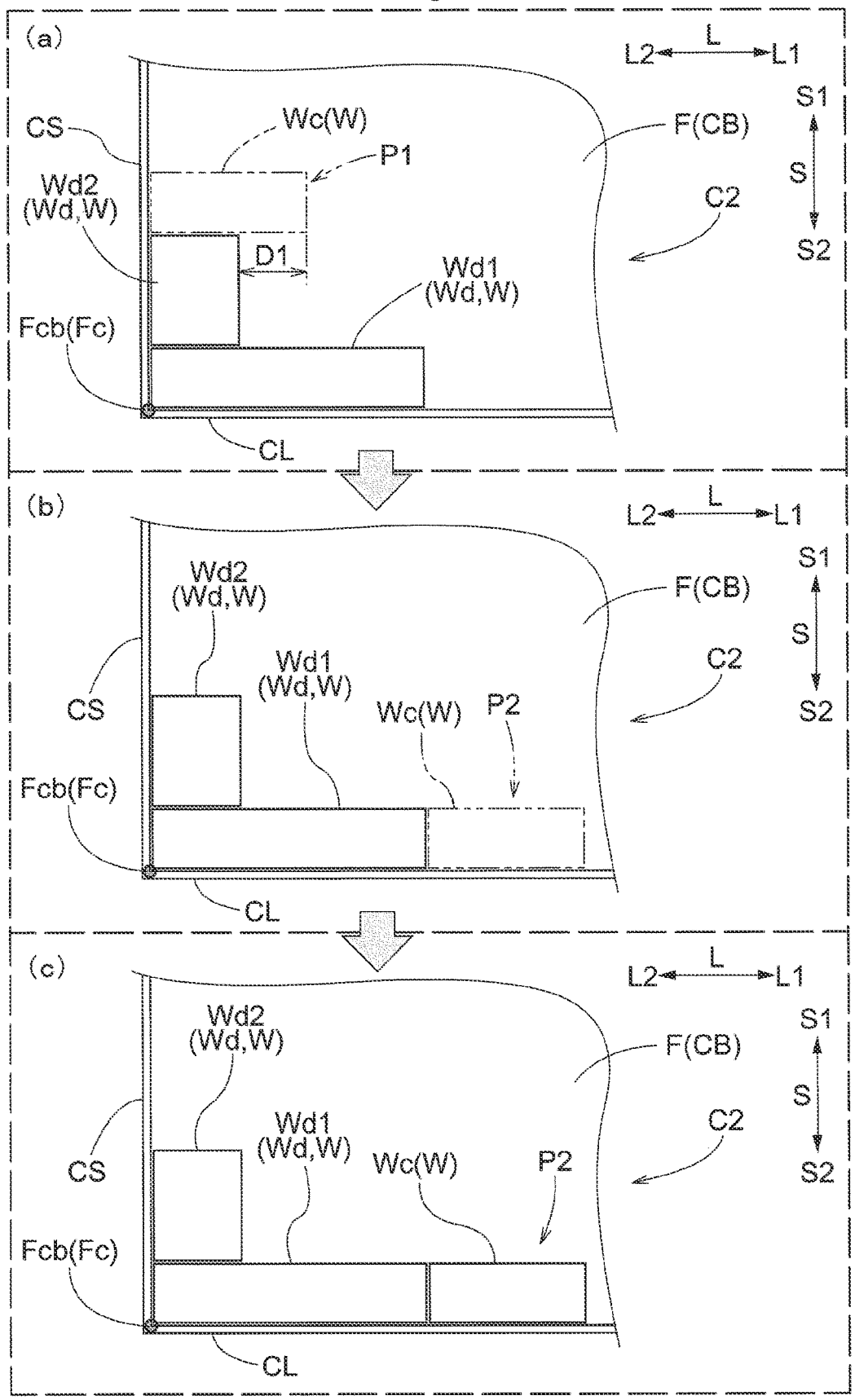
FIG. 9 is a diagram illustrating processing for setting an arrangement position of a target article performed by the control unit when there are two set articles.

In the example shown in FIG. 9, the first protrusion length D1 is greater than or equal to the first protrusion threshold TH1, similarly to the example shown in FIG. 8 (see the portion (a) in FIG. 9). However, the length in the first direction S of the target article Wc is the same as the length in the first direction S of the first set article Wd1, and therefore, at the second candidate position P2, the target article Wc does not protrude in the first direction S relative to the first set article Wd1 (see the portion (b) in FIG. 9), unlike the example shown in FIG. 8. In this case as well, the control device 10 sets the second candidate position P2 as the arrangement position of the target article Wc, similarly to the example shown in FIG. 8 (see the portion (c) in FIG. 9).

Figure 10:
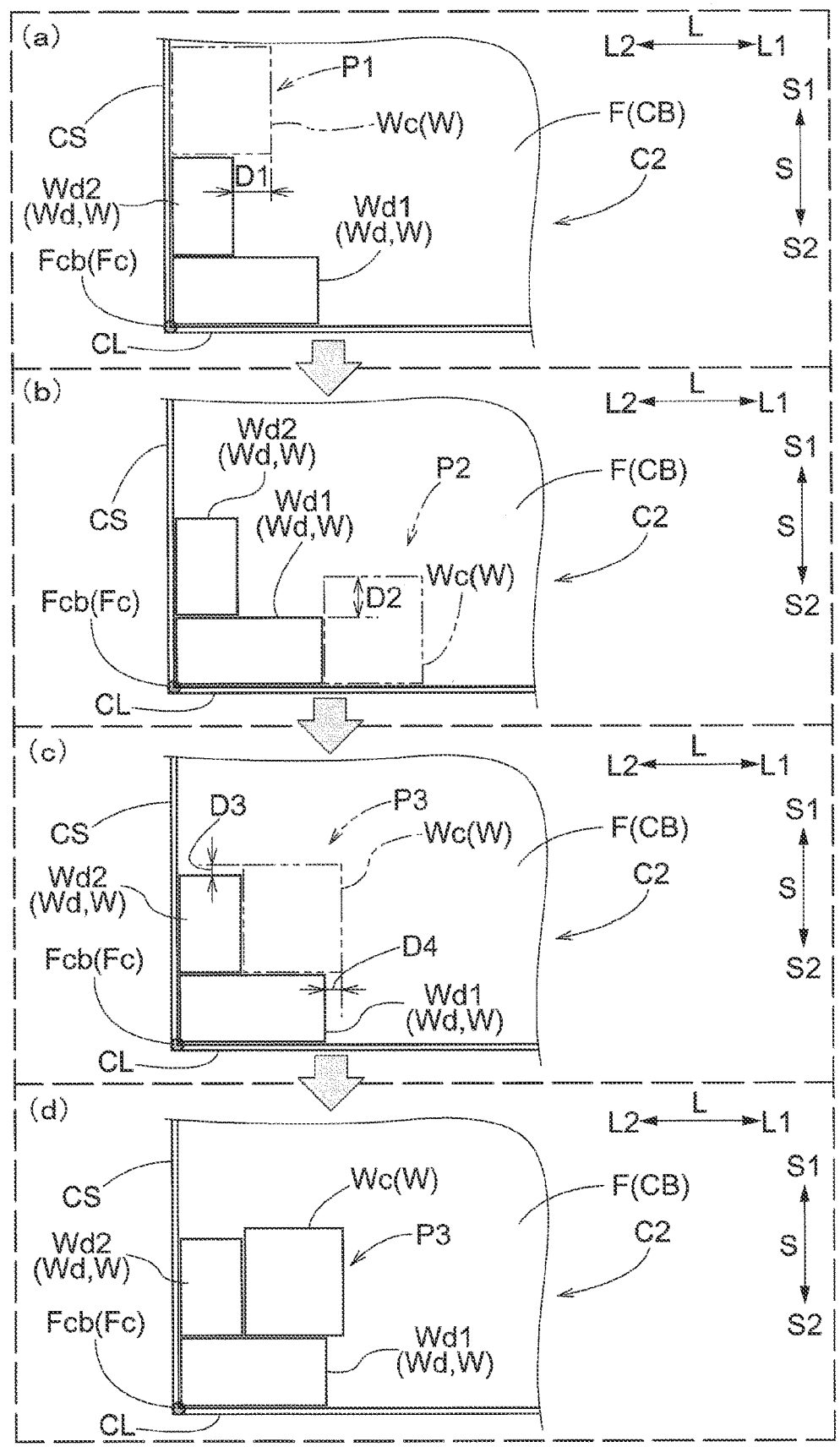
FIG. 10 is a diagram illustrating processing for setting an arrangement position of a target article performed by the control unit when there are two set articles.

In the example shown in FIG. 10, the first protrusion length D1 is greater than or equal to the first protrusion threshold TH1 (see the portion (a) in FIG. 10), similarly to the examples shown in FIGS. 8 and 9. However, the second protrusion length D2 is greater than or equal to the second protrusion threshold TH2 (see the portion (b) in FIG. 10), unlike the examples shown in FIGS. 8 and 9. In this case, the control device 10 detects a third candidate position P3, which is a candidate for the arrangement position of the target article Wc and differs from the first candidate position P1 and the second candidate position P2 (see the portion (c) in FIG. 10). The third candidate position P3 is adjacent to the set articles Wd on both the far side in the first direction S1 and the far side in the second direction L1. Here, the third candidate position P3 is adjacent to the first set article Wd1 on the far side in the first direction S1, and is adjacent to the second set article Wd2 on the far side in the second direction L1.

The control device 10 determines the size of a third dead space, which is a dead space in a plan view formed in a region surrounded by a set article Wd and the target article Wc if the target article Wc is arranged at the third candidate position P3.

In this example, the size of the third dead space is determined based on a third protrusion length D3, which is a protrusion length in the first direction S of the target article Wc relative to a set article Wd, and a fourth protrusion length D4, which is a protrusion length in the second direction L of the target article Wc relative to a set article Wd. Here, the third protrusion length D3 is a protrusion length in the first direction S of the target article Wc relative to the second set article Wd2, and the fourth protrusion length D4 is a protrusion length in the second direction L of the target article Wc relative to the first set article Wd1.

The control device 10 compares the third protrusion length D3 with a third prescribed threshold TH3, and compares the fourth protrusion length D4 with a prescribed fourth threshold TH4. The third protrusion threshold TH3 and the fourth protrusion threshold TH4 each correspond to a "third threshold".

In the example shown in FIG. 10, the third protrusion length D3 is smaller than the third protrusion threshold TH3, and the fourth protrusion length D4 is smaller than the fourth protrusion threshold TH4. In this case, the control device 10 sets the third candidate position P3 as the arrangement position of the target article Wc (see the portion (d) in FIG. 10).

Figure 11:
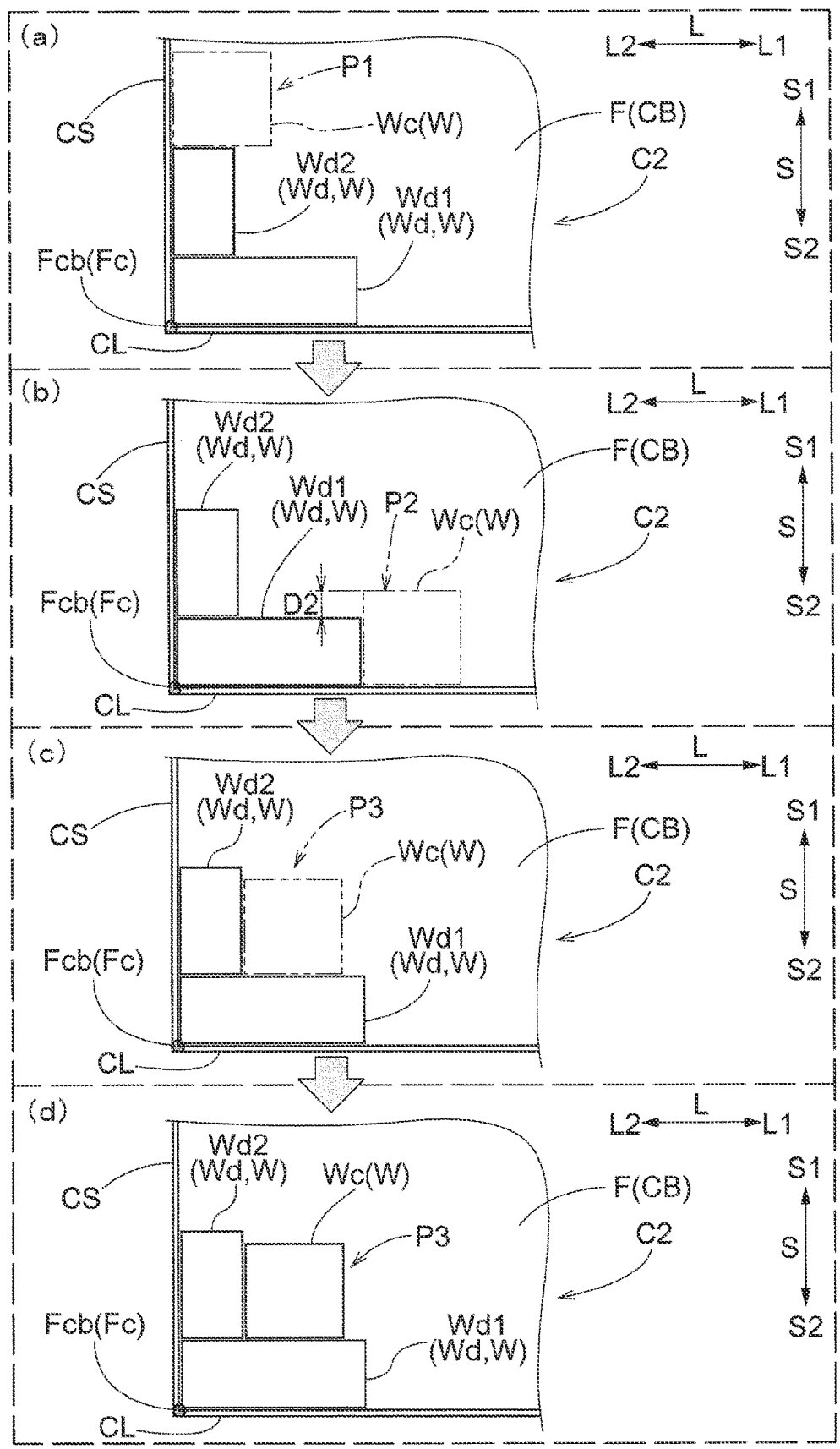
FIG. 11 is a diagram illustrating processing for setting an arrangement position of a target article performed by the control unit when there are two set articles.

In the example shown in FIG. 11, the first protrusion length D1 is greater than or equal to the first threshold TH1, and the second protrusion length D2 is greater than or equal to the second threshold TH2 (see the portions (a) and (b) in FIG. 11), similarly to the example shown in FIG. 10. However, at the third candidate position P3, the target article Wc does not protrude either in the first direction S or the second direction L relative to the set articles Wd (see the portion (c) in FIG. 11), unlike the example shown in FIG. 10. In this case as well, the control device 10 sets the third candidate position P3 as the arrangement position of the target article Wc, similarly to the example shown in FIG. 10 (see the portion (d) in FIG. 11).

Figure 12:
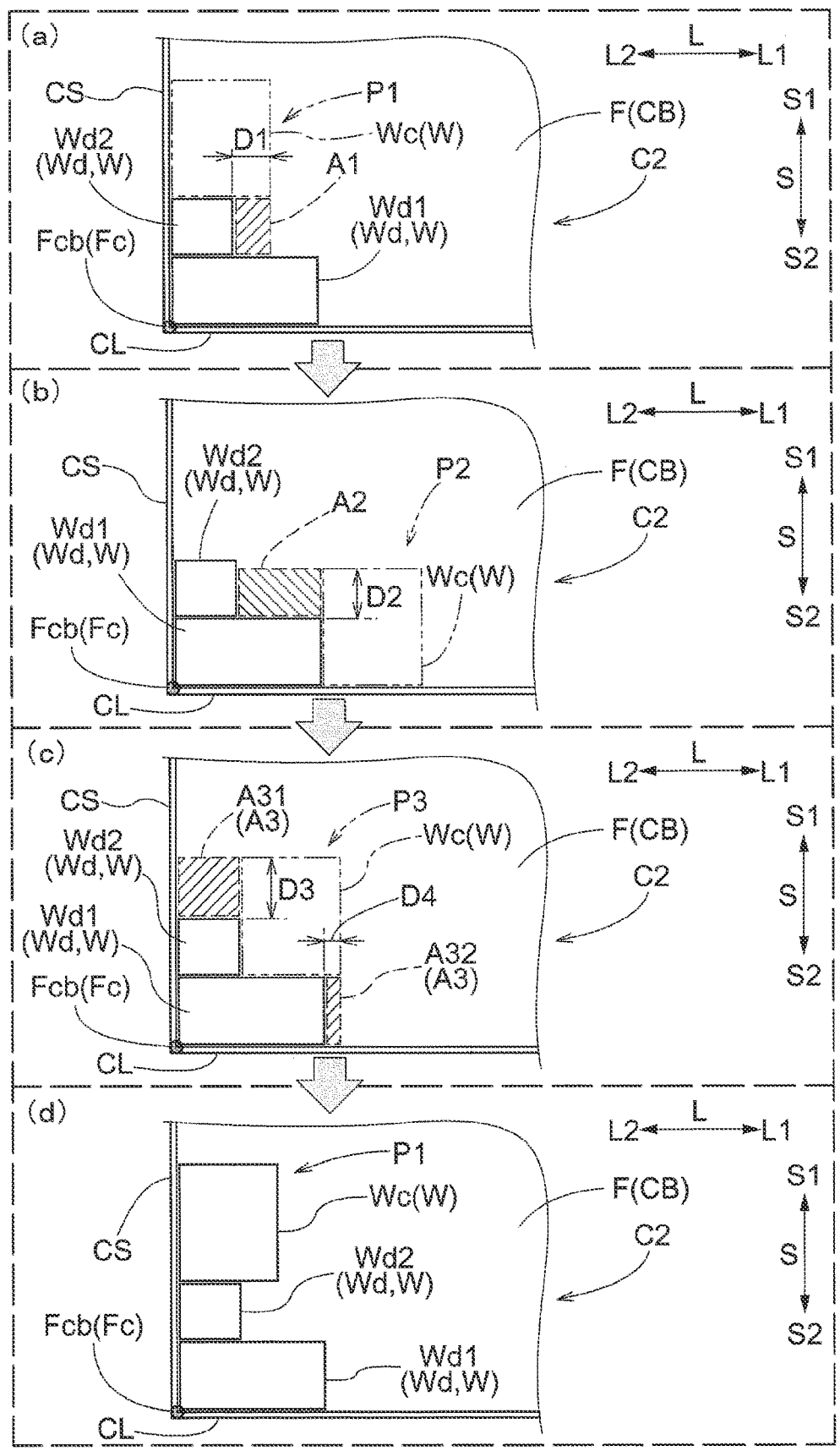
FIG. 12 is a diagram illustrating processing for setting an arrangement position of a target article performed by the control unit when there are two set articles.

In the example shown in FIG. 12, the first protrusion length D1 is greater than or equal to the first protrusion threshold TH1, and the second protrusion length D2 is greater than or equal to the second threshold TH2 (see the portions (a) and (b) in FIG. 12), similarly to the examples shown in FIGS. 10 and 11. Further, the fourth protrusion length D4 is smaller than the fourth protrusion threshold TH4, similarly to the example shown in FIG. 10. However, the third protrusion length D3 is greater than or equal to the third protrusion threshold TH3 (see the portion (c) in FIG. 12), unlike the example shown in FIG. 10). In this case, the control device 10 compares the size of the first dead space, the size of the second dead space, and the size of the third dead space with each other.

In this example, the size of the first dead space, the size of the second dead space, and the size of the third dead space are compared with each other based on a first area A1, which is the area of the first dead space (see the portion (a) in FIG. 12), a second area A2, which is the area of the second dead space (see the portion (b) in FIG. 12), and a third area A3, which is the area of the third dead space (see the portion (c) in FIG. 12).

Here, the first area A1 is the area of a rectangular region surrounded by the target article Wc, the set article Wd located at the first candidate position P1, the first set article Wd1, and the second set article Wd2, and is calculated based on the first protrusion length D1. The second area A2 is the area of a rectangular region surrounded by the target article Wc located at the second candidate position P2, the first set article Wd1, and the second set article Wd2, and is calculated based on the second protrusion length D2.

The third area A3 is the total of a third protrusion-side area A31 and a fourth protrusion-side area A32. The third protrusion-side area A31 is the area of a rectangular region surrounded by the target article Wc located at the third candidate position P3, the second set article Wd2, and the short-wall portion CS, and is calculated based on the third protrusion length D3. The fourth protrusion-side area A32 is the area of a rectangular region surrounded by the target article Wc located at the third candidate position P3, the first set article Wd1, and the long-wall portion CL, and is calculated based on the fourth protrusion length D4.

In the example shown in FIG. 12, the first area A1 is the smallest among the first area A1, the second area A2, and the third area A3. In this case, the control device 10 sets the first candidate position P1, which is the position of the target article Wc that forms the first dead space, as the arrangement position of the target article Wc (see the portion (d) in FIG. 12).

Figure 13:
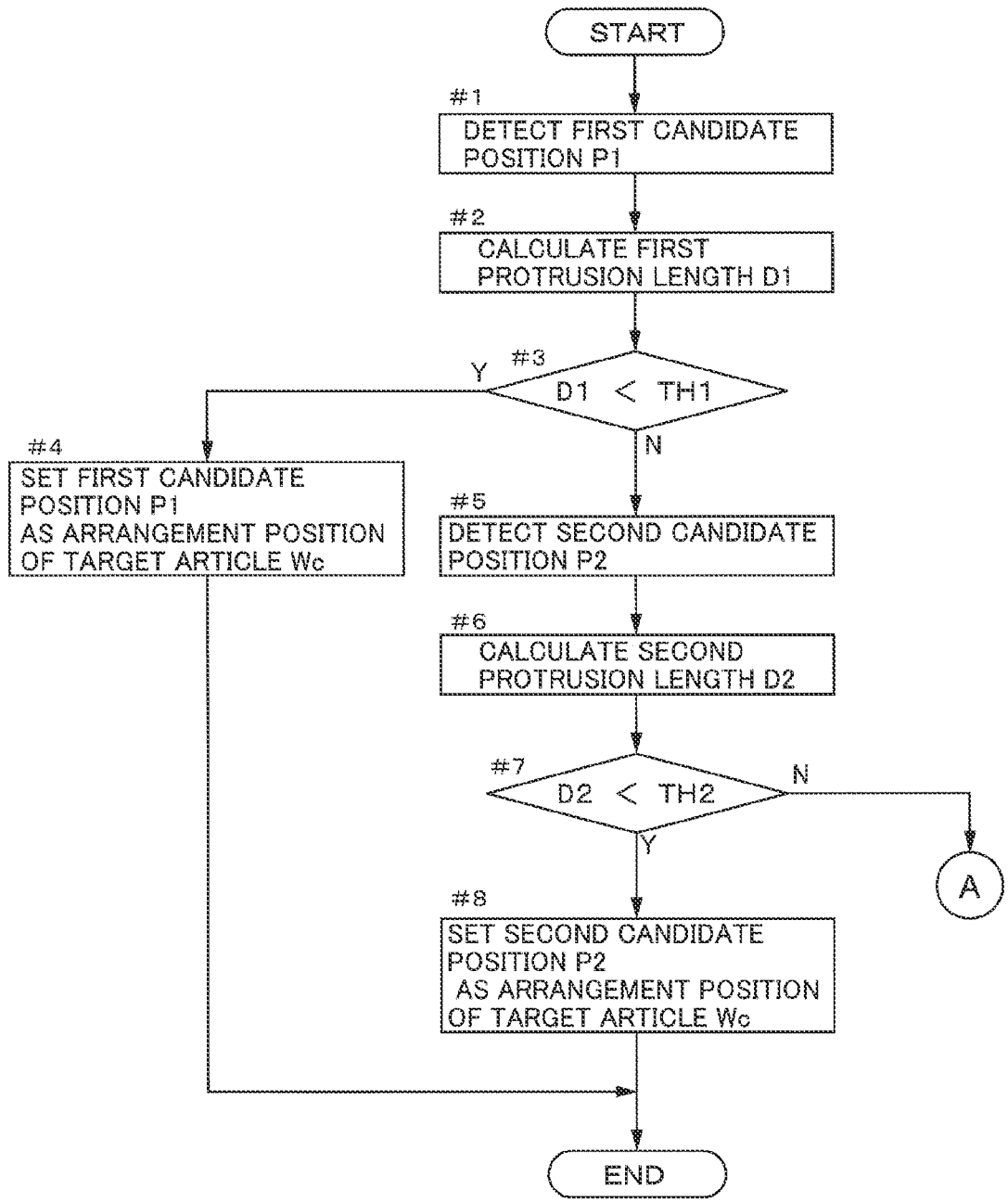
FIG. 13 is a flowchart illustrating processing for setting an arrangement position of a target article performed by the control unit.
Figure 14:
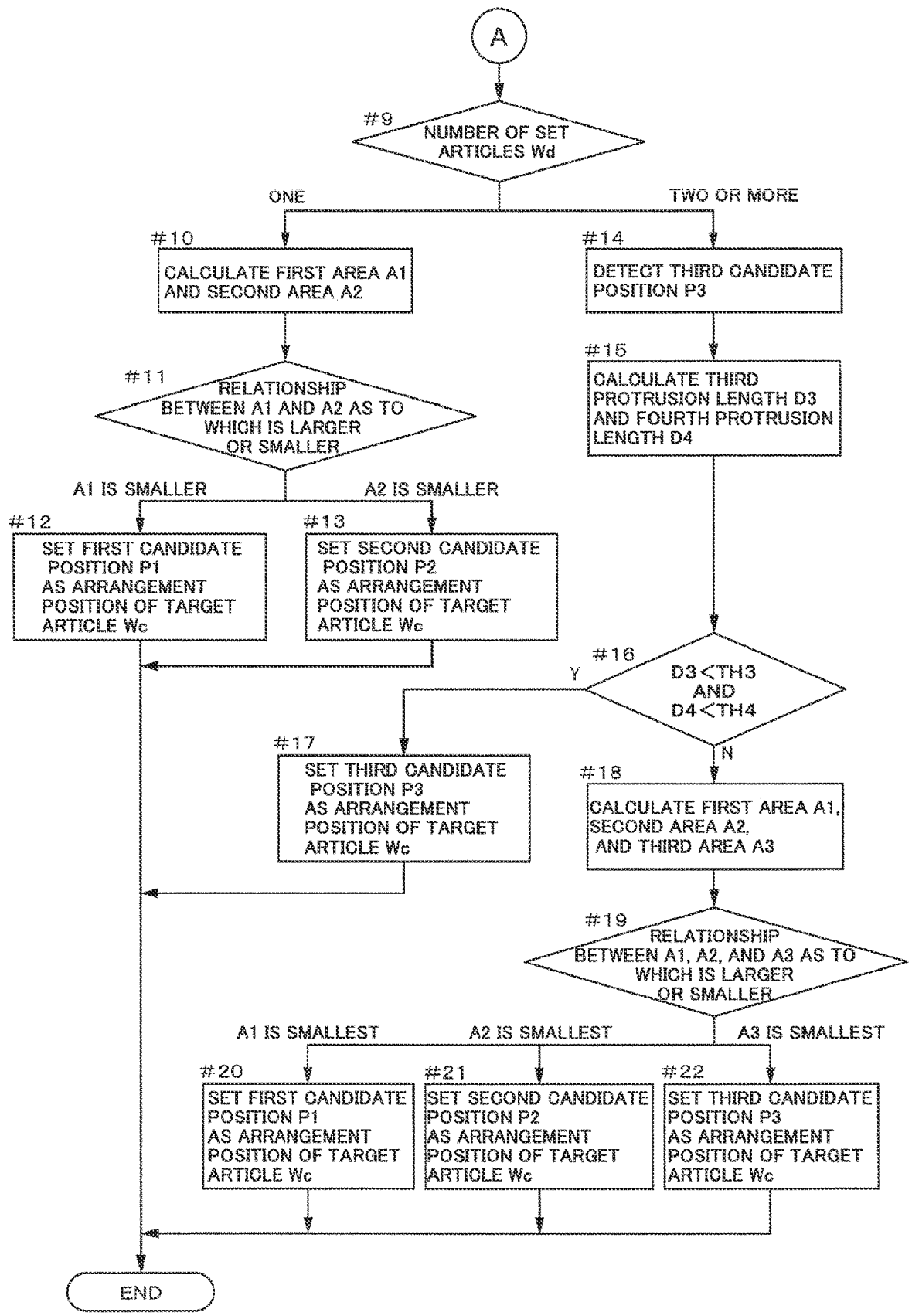
FIG. 14 is a flowchart illustrating processing for setting an arrangement position of a target article performed by the control unit.

FIGS. 13 and 14 show flowcharts regarding an example of processing for setting the arrangement position of the target article Wc performed by the control device 10. As shown in FIG. 13, the control device 10 first detects the first candidate position P1, which is a position adjacent to a set article Wd on the far side in the first direction S1 and is an end position on the close side in the second direction L2 (step #1). Next, the control device 10 calculates the first protrusion length D1, which is a protrusion length in the second direction L of the target article Wc located at the first candidate position P1 relative to the set article Wd (step #2). The control device 10 then determines whether or not the first protrusion length D1 is smaller than the prescribed first protrusion threshold TH1 (step #3).

If it is determined that the first protrusion length D1 is smaller than the first protrusion threshold TH1, the control device 10 sets the first candidate position P1 as the arrangement position of the target article Wc (step #4), and ends the setting processing.

On the other hand, if it is determined that the first protrusion length D1 is greater than or equal to the first threshold TH1, the control device 10 detects the second candidate position P2, which is a position adjacent to a set article Wd on the far side in the second direction L1 and is an end position on the close side in the first direction S2 (step #5). Next, the control device 10 calculates the second protrusion length D2, which is a protrusion length in the first direction S of the target article Wc located at the second candidate position P2 relative to the set article Wd (step #6). The control device 10 then determines whether or not the second protrusion length D2 is smaller than the prescribed second protrusion threshold TH2 (step #7).

If it is determined that the second protrusion length D2 is smaller than the second protrusion threshold TH2, the control device 10 sets the second candidate position P2 as the arrangement position of the target article Wc (step #8), and ends the setting processing.

On the other hand, if it is determined that the second protrusion length D2 is greater than or equal to the second protrusion threshold TH2, the control device 10 performs processing corresponding to the number of set articles Wd (step #9), as shown in FIG. 14.

First, a description will be given of the case where there is one set article Wd. If it is determined that there is one set article Wd, the control device 10 calculates the first area A1, which is the area of the first dead space, and the second area A2, which is the area of the second dead space (step #10). The control device 10 then compares the first area A1 with the second area A2 (step #11).

If it is determined that the first area A1 is smaller than the second area A2, the control device 10 sets the first candidate position P1 as the arrangement position of the target article Wc (step #12), and ends the setting processing. On the other hand, if it is determined that the second area A2 is smaller than the first area A1, the control device 10 sets the second candidate position P2 as the arrangement position of the target article Wc (step #13), and ends the setting processing.

Next, a description will be given of the case where there are two or more set articles Wd. If the control device 10 determines that there are two or more set articles Wd, the control device 10 detects the third candidate position P3, which is a position adjacent to the set articles Wd on both the far side in the first direction S1 and the far side in the second direction L1, and is an end position on the reference corner portion Fcb side (step #14).

Subsequently, the control device 10 calculates the third protrusion length D3, which is a protrusion length in the first direction S of the target article Wc located at the third candidate position P3 relative to a set article Wd, and a fourth protrusion length D4, which is a protrusion length in the second direction L of the target article Wc located at the third candidate position P3 relative to a set article Wd (step #15). The control device 10 then determines whether or not the third protrusion length D3 is smaller than the prescribed third protrusion threshold TH3, and whether or not the fourth protrusion length D4 is smaller than the prescribed fourth protrusion threshold TH4 (step #16).

If it is determined that the third protrusion length D3 is smaller than the prescribed third protrusion threshold TH3, and that the fourth protrusion length D4 is smaller than the prescribed fourth protrusion threshold TH4, the control device 10 sets the third candidate position P3 as the arrangement position of the target article Wc (step #17), and ends the setting processing.

On the other hand, if it is determined that the third protrusion length D3 is greater than or equal to the prescribed third protrusion threshold TH3 and/or that the fourth protrusion length D4 is greater than or equal to the fourth protrusion threshold TH4, the control device 10 calculates the first area A1, which is the area of the first dead space, the second area A2, which is the area of the second dead space, and the third area A3, which is the area of the third dead space (step #18). Then, the control device 10 compares the first area A1, the second area A2, and the third area A3 with each other (step #19).

If it is determined that the first area A1 is the smallest among the first area A1, the second area A2, and the third area A3, the control device 10 sets the first candidate position P1 as the arrangement position of the target article Wc (step #20), and ends the setting processing. If it is determined that the second area A2 is the smallest among the first area A1, the second area A2, and the third area A3, the control device 10 sets the second candidate position P2 as the arrangement position of the target article Wc (step #21), and ends the setting processing. If it is determined that the third area A3 is the smallest among the first area A1, the second area A2, and the third area A3, the control device 10 sets the third candidate position P3 as the arrangement position of the target article Wc (step #22), and ends the setting processing.

Other Embodiments (1) The above embodiment has described, as an example, a configuration in which the size of each dead space is determined based on the protrusion lengths (first protrusion length D1, second protrusion length D2, third protrusion length 3, and fourth protrusion length D4) of the target article Wc relative to set articles Wd. However, the invention is not limited to such a configuration, and a configuration may alternatively be employed in which the size of each dead space is determined based on the area of the dead space (first area A1, second area A2, third area A3, and fourth area A4) in a plan view, for example. Alternatively, a configuration may be employed in which the size of each dead space is determined based on the volume of the dead space.

(2) The above embodiment has described, as an example, a configuration in which the first protrusion length D1, the second protrusion length D2, the third protrusion length 3, and the fourth protrusion length D4 are compared with the first protrusion threshold TH1, the second protrusion threshold TH2, the third protrusion threshold TH3, and the fourth protrusion threshold TH4, respectively. These thresholds may differ from each other, or some of the thresholds may be the same as the other thresholds, or all of the thresholds may be the same.

(3) The above embodiment has described, as an example, a configuration in which the sizes of the dead spaces are compared based on the areas of the respective dead spaces (first area A1, second area A2, third area A3, and fourth area A4) in a plan view. However, the invention is not limited to such a configuration, and a configuration may alternatively be employed in which the sizes of the dead spaces are compared based on the volumes of the respective dead spaces, for example. Alternatively, a configuration may be employed in which the sizes of the dead spaces are compared based on the protrusion lengths (first protrusion length D1, second protrusion length D2, third protrusion length 3, and fourth protrusion length D4) of the target article Wc relative to set articles Wd.

(4) The above embodiment has described, as an example, a configuration in which the arrangement region for articles W is a rectangular mounting surface F of the second container C2. However, the invention is not limited to such a configuration, and the arrangement region for articles W may alternatively be a pallet that has a rectangular shape in a plan view, for example.

(5) The above embodiment has described, as an example, a configuration in which the first transport device 11 and the second transport device 12 are provided. However, the invention is not limited to such a configuration, and a configuration may be employed in which either the first transport device 11 or the second transport device 12 is provided, or in which neither transport device is provided. In such a configuration, for example, the operator may supply the first containers C1 or the second containers C2 to the first work position Pw1 or the second work position Pw2.

(6) Note that the configuration disclosed in the above embodiment can also be applied in combination with configurations disclosed in other embodiments as long as no contradiction arises. Regarding other configurations as well, the embodiment disclosed in the present specification is merely an example in all respects. Accordingly, various modifications can be made as appropriate, without departing from the gist of the present disclosure.

Summary of the Above Embodiment

The summary of the above-described article transfer facility will be described below.

The article transfer facility is an article transfer facility that performs an article transfer operation, including:

a transfer device for holding an article and arranging the article in an arrangement region having a rectangular shape in a plan view; and a control device for controlling the transfer device, wherein, letting one corner portion of the arrangement region be a reference corner portion, a direction parallel to one of two orthogonal sides of the arrangement region be a first direction, a direction parallel to the other one of the two orthogonal sides of the arrangement region be a second direction, the side farther from the reference corner portion in the first direction be a far side in the first direction, the side closer to the reference corner portion in the first direction be a close side in the first direction, the side farther from the reference corner portion in the second direction be a far side in the second direction, and the side closer to the reference corner portion in the second direction be a close side in the second direction, the control device is configured to perform setting of an arrangement position of the article in the arrangement region such that a plurality of the articles are arranged in order from a position adjacent to the reference corner portion, and to control the transfer device in accordance with the setting, also letting every article whose arrangement position in the arrangement region has already been set be a set article, and an article whose arrangement position is to be set next be a target article, the control device determines a size of a first dead space, which is a dead space in a plan view formed in a region surrounded by the set article and the target article if the target article is arranged at a first candidate position, which is a position adjacent to the set article on the far side in the first direction and is an end position on the close side in the second direction, if the size of the first dead space is smaller than a prescribed first threshold, the control device sets the first candidate position as the arrangement position of the target article, if the size of the first dead space is greater than or equal to the first threshold, the control device determines a size of a second dead space, which is a dead space in a plan view formed in a region surrounded by the set article and the target article if the target article is arranged at a second candidate position, which is a position adjacent to the set article on the far side in the second direction and is an end position on the close side in the first direction, and if the size of the second dead space is smaller than a prescribed second threshold, the control device sets the second candidate position as the arrangement position of the target article.

According to this configuration, not only the first candidate position adjacent to the set article on the far side in the first direction but also the second candidate position adjacent to the set article on the far side in the second direction are candidates for the arrangement position of the target article, in accordance with the size of the first dead space and the size of the second dead space. That is to say, the direction in which articles are arranged is changed in accordance with the size of the first dead space and the size of the second dead space. Thus, articles can be efficiently arranged in the arrangement region. As a result, the dead space formed in the arrangement region for articles can be appropriately reduced.

Here, it is preferable that if the size of the second dead space is greater than or equal to the second threshold, and there is one set article, the control device compares the size of the first dead space with the size of the second dead space, if the first dead space is smaller than the second dead space, the control device sets the first candidate position as the arrangement position of the target article, and if the second dead space is smaller than the first dead space, the control device sets the second candidate position as the arrangement position of the target article.

According to this configuration, when there is one set article, and both the first and second dead spaces are relatively large, the position of the target article that forms the smaller one of these dead spaces is set as the arrangement position of the target article. Thus, even if a relatively large dead space is formed in the arrangement region, the size of this dead space can be minimized.

It is preferable that, in the configuration in which the control device compares the size of the first dead space with the size of the second dead space, the comparison is performed based on the area of the first dead space and the area of the second dead space.

According to this configuration, the size of the first dead space and the size of the second dead space are compared using the areas thereof that can be relatively easily calculated and that can appropriately represent the sizes of these dead spaces. Thus, the sizes of the dead spaces can be appropriately compared, and the computing load for this comparison can be reduced.

It is preferable that the control device determines the size of the first dead space based on a protrusion length in the second direction of the target article relative to the set article, and the control device determines the size of the second dead space based on a protrusion length in the first direction of the target article relative to the set article.

According to this configuration, the sizes of the dead spaces are determined using the protrusion lengths of the target article relative to set articles that can be relatively easily calculated. Thus, the computing load for determining the sizes of the dead spaces can be reduced.

It is preferable that if the size of the second dead space is greater than or equal to the second threshold, and there are two or more set articles, the control device determines a size of a third dead space, which is a dead space in a plan view formed in a region surrounded by the set article and the target article if the target article is arranged at a third candidate position, which is a position adjacent to the set article on both the far side in the first direction and the far side in the second direction and is an end position on the side of the reference corner portion, and if the size of the third dead space is smaller than a prescribed third threshold, the control device sets the third candidate position as the arrangement position of the target article.

According to this configuration, when there are two or more set articles, and both the first and second dead spaces are relatively large, the third candidate position that differs from the first and second candidate positions is a candidate for the arrangement position of the target article. Thus, even when there are two or more set articles, the arrangement position of the target article is appropriately set. Accordingly, articles can be more efficiently arranged in the arrangement region. As a result, the dead space formed in the arrangement region can be further reduced.

In the configuration in which the control device determines the size of the third dead space, it is preferable that if the size of the third dead space is greater than or equal to the third threshold, the control device compares the size of the first dead space, the size of the second dead space, and the size of the third dead space with each other, if the first dead space is the smallest, the control device sets the first candidate position as the arrangement position of the target article, if the second dead space is the smallest, the control device sets the second candidate position as the arrangement position of the target article, and if the third dead space is the smallest, the control device sets the third candidate position as the arrangement position of the target article.

According to this configuration, when there are two or more set articles, and all of the first, second, and third dead spaces are relatively large, the position of the target article that forms the smallest one of these dead spaces is set as the arrangement position of the target article. Thus, even if a relatively large dead space is formed in the arrangement region, the size of this dead space can be minimized.

Here, it is preferable that the control device compares the size of the first dead space, the size of the second dead space, and the size of the third dead space with each other based on the area of the first dead space, the area of the second dead space, and the area of the third dead space.

According to this configuration, the size of the first dead space, the size of the second dead space, and the size of the third dead space are compared using the areas thereof that can be relatively easily calculated and that can appropriately represent the sizes of these dead spaces. Thus, the sizes of the dead spaces can be appropriately compared, and the computing load for this comparison can be reduced.

It is preferable that the control device determines the size of the third dead space based on a protrusion length in the first direction of the target article relative to the set article, and on a protrusion length in the second direction of the target article relative to the set article.

According to this configuration, the size of the third dead space is determined using the protrusion length of the target article relative to a set article that can be relatively easily calculated. Thus, the computing load for determining the size of the third dead space can be reduced.

INDUSTRIAL APPLICABILITY

The technology according to the present disclosure can be used in an article transfer facility that performs an article transfer operation.

DESCRIPTION OF REFERENCE SIGNS

100: Article transfer facility
2: Transfer device
10: Control device
W: Article
Wd: Set article
Wc: Target article
F: Mounting surface (arrangement region)
Fc: Corner portion
Fcb: Reference corner portion
P1: First candidate position
P2: Second candidate position
P3: Third candidate position
D1: First protrusion length
D2: Second protrusion length
D3: Third protrusion length
D4: Fourth protrusion length
TH1: First protrusion threshold (first threshold)
TH2: Second protrusion threshold (second threshold)
TH3: Third protrusion threshold (third threshold)
TH4: Fourth protrusion threshold (third threshold)
A1: First area
A2: Second area
A3: Third area
S: First direction
S1: Far side in first direction
S2: Close side in first direction
L: Second direction
L1: Far side in second direction
L2: Close side in second direction

The invention claimed is:

1. An article transfer facility that performs an article transfer operation, comprising:
   a transfer device for holding an article and arranging the article in an arrangement region having a rectangular shape in a plan view; and
   a control device for controlling the transfer device,
   wherein one corner portion of the arrangement region is a reference corner portion, a direction parallel to one of two orthogonal sides of the arrangement region is a first direction, a direction parallel to the other one of the two orthogonal sides of the arrangement region is a second direction,
   wherein the side farther from the reference corner portion in the first direction is a far side in the first direction, the side closer to the reference corner portion in the first direction is a close side in the first direction, the side farther from the reference corner portion in the second direction is a far side in the second direction, and the side closer to the reference corner portion in the second direction is a close side in the second direction,
   wherein the control device is configured to perform setting of an arrangement position of the article in the arrangement region such that a plurality of the articles are arranged in order from a position adjacent to the reference corner portion, and to control the transfer device in accordance with the setting,
   wherein with every article whose arrangement position in the arrangement region has already been set being a set article and an article whose arrangement position is to be set next being a target article,
   the control device determines a size of a first dead space, which is a dead space in a plan view formed in a region surrounded by the set article and the target article if the target article is arranged at a first candidate position, which is a position adjacent to the set article on the far side in the first direction and is an end position on the close side in the second direction,
   wherein if the size of the first dead space is smaller than a prescribed first threshold, the control device sets the first candidate position as the arrangement position of the target article,
   wherein if the size of the first dead space is greater than or equal to the first threshold, the control device determines a size of a second dead space, which is a dead space in a plan view formed in a region surrounded by the set article and the target article if the target article is arranged at a second candidate position, and which is a position adjacent to the set article on the far side in the second direction and is an end position on the close side in the first direction, and
   wherein if the size of the second dead space is smaller than a prescribed second threshold, the control device sets the second candidate position as the arrangement position of the target article.

2. The article transfer facility according to claim 1,
   wherein if the size of the second dead space is greater than or equal to the second threshold and there is one set article, the control device compares the size of the first dead space with the size of the second dead space,
   wherein if the first dead space is smaller than the second dead space, the control device sets the first candidate position as the arrangement position of the target article, and
   wherein if the second dead space is smaller than the first dead space, the control device sets the second candidate position as the arrangement position of the target article.

3. The article transfer facility according to claim 2,
   wherein the control device compares the size of the first dead space with the size of the second dead space based on the area of the first dead space and the area of the second dead space.

4. The article transport facility according to claim 1,
   wherein the control device determines the size of the first dead space based on a protrusion length in the second direction of the target article relative to the set article, and
   wherein the control device determines the size of the second dead space based on a protrusion length in the first direction of the target article relative to the set article.

5. The article transport facility according to claim 1,
   wherein if the size of the second dead space is greater than or equal to the second threshold and there are two or more set articles, the control device determines a size of a third dead space, which is a dead space in a plan view formed in a region surrounded by the set article and the target article if the target article is arranged at a third candidate position, which is a position adjacent to the set article on both the far side in the first direction and the far side in the second direction and is an end position on the side of the reference corner portion, and wherein if the size of the third dead space is smaller than a prescribed third threshold, the control device sets the third candidate position as the arrangement position of the target article.

6. The article transfer facility according to claim 5, wherein if the size of the third dead space is greater than or equal to the third threshold, the control device compares the size of the first dead space, the size of the second dead space, and the size of the third dead space with each other,
wherein if the first dead space is the smallest, the control device sets the first candidate position as the arrangement position of the target article,
wherein if the second dead space is the smallest, the control device sets the second candidate position as the arrangement position of the target article, and
wherein if the third dead space is the smallest, the control device sets the third candidate position as the arrangement position of the target article.

7. The article transfer facility according to claim 5, wherein the control device compares the size of the first dead space, the size of the second dead space, and the size of the third dead space with each other based on the area of the first dead space, the area of the second dead space, and the area of the third dead space.

8. The article transport facility according to claim 5, wherein the control device determines the size of the third dead space based on a protrusion length in the first direction of the target article relative to the set article, and on a protrusion length in the second direction of the target article relative to the set article.

9. The article transport facility according to claim 2, wherein the control device determines the size of the first dead space based on a protrusion length in the second direction of the target article relative to the set article, and
wherein the control device determines the size of the second dead space based on a protrusion length in the first direction of the target article relative to the set article.

10. The article transport facility according to claim 3, wherein the control device determines the size of the first dead space based on a protrusion length in the second direction of the target article relative to the set article, and
wherein the control device determines the size of the second dead space based on a protrusion length in the first direction of the target article relative to the set article.

11. The article transport facility according to claim 2, wherein if the size of the second dead space is greater than or equal to the second threshold and there are two or more set articles, the control device determines a size of a third dead space, which is a dead space in a plan view formed in a region surrounded by the set article and the target article if the target article is arranged at a third candidate position, which is a position adjacent to the set article on both the far side in the first direction and the far side in the second direction and is an end position on the side of the reference corner portion, and
wherein if the size of the third dead space is smaller than a prescribed third threshold, the control device sets the third candidate position as the arrangement position of the target article.

12. The article transport facility according to claim 3, wherein if the size of the second dead space is greater than or equal to the second threshold and there are two or more set articles, the control device determines a size of a third dead space, which is a dead space in a plan view formed in a region surrounded by the set article and the target article if the target article is arranged at a third candidate position, which is a position adjacent to the set article on both the far side in the first direction and the far side in the second direction and is an end position on the side of the reference corner portion, and
wherein if the size of the third dead space is smaller than a prescribed third threshold, the control device sets the third candidate position as the arrangement position of the target article.

13. The article transport facility according to claim 4, wherein if the size of the second dead space is greater than or equal to the second threshold and there are two or more set articles, the control device determines a size of a third dead space, which is a dead space in a plan view formed in a region surrounded by the set article and the target article if the target article is arranged at a third candidate position, which is a position adjacent to the set article on both the far side in the first direction and the far side in the second direction and is an end position on the side of the reference corner portion, and
wherein if the size of the third dead space is smaller than a prescribed third threshold, the control device sets the third candidate position as the arrangement position of the target article.

14. The article transfer facility according to claim 6, wherein the control device compares the size of the first dead space, the size of the second dead space, and the size of the third dead space with each other based on the area of the first dead space, the area of the second dead space, and the area of the third dead space.

15. The article transport facility according to claim 6, wherein the control device determines the size of the third dead space based on a protrusion length in the first direction of the target article relative to the set article, and on a protrusion length in the second direction of the target article relative to the set article.

16. The article transport facility according to claim 7, wherein the control device determines the size of the third dead space based on a protrusion length in the first direction of the target article relative to the set article, and on a protrusion length in the second direction of the target article relative to the set article.

* * * * *

UNITED STATES PATENT AND TRADEMARK OFFICE
CERTIFICATE OF CORRECTION

PATENT NO. : 11,339,012 B2
APPLICATION NO. : 17/418443
DATED : May 24, 2022
INVENTOR(S) : Atsushi Minoo It is certified that error appears in the above-identified patent and that said Letters Patent is hereby corrected as shown below:

In the Claims

Column 18, Line 48, Claim 4, delete "article transport facility" and insert -- article transfer facility --

Column 18, Line 57, Claim 5, delete "article transport facility" and insert -- article transfer facility --

Column 19, Line 26, Claim 8, delete "article transport facility" and insert -- article transfer facility --

Column 19, Line 32, Claim 9, delete "article transport facility" and insert -- article transfer facility --

Column 19, Line 41, Claim 10, delete "article transport facility" and insert -- article transfer facility --

Column 19, Line 50, Claim 11, delete "article transport facility" and insert -- article transfer facility --

Column 20, Line 8, Claim 12, delete "article transport facility" and insert -- article transfer facility --

Column 20, Line 23, Claim 13, delete "article transport facility" and insert -- article transfer facility --

Column 20, Line 45, Claim 15, delete "article transport facility" and insert -- article transfer facility --

Column 20, Line 51, Claim 16, delete "article transport facility" and insert -- article transfer facility --

Signed and Sealed this
Nineteenth Day of July, 2022

Katherine Kelly Vidal
*Director of the United States Patent and Trademark Office*